July 16, 1946.  W. E. HILL ET AL  2,403,979
COUPLING FOR ELECTRICAL WIRING SYSTEMS
Filed June 13, 1944  2 Sheets-Sheet 1
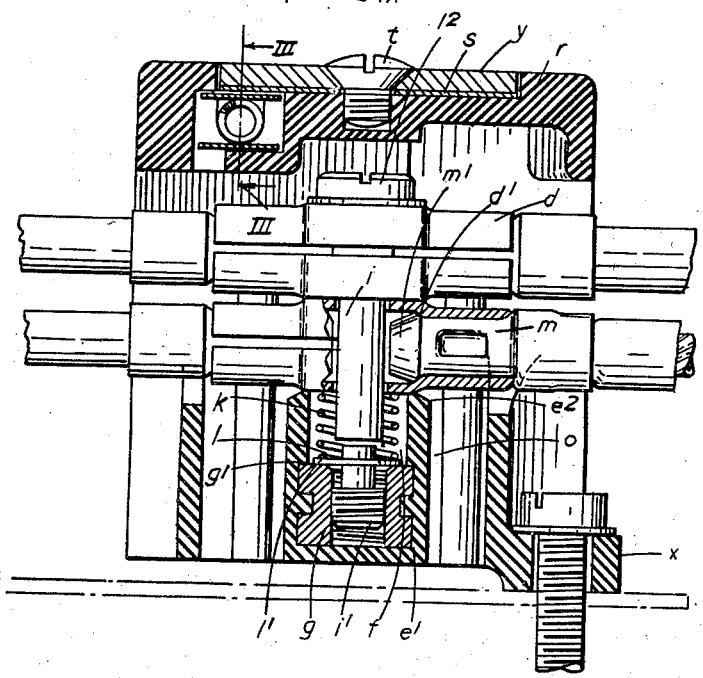
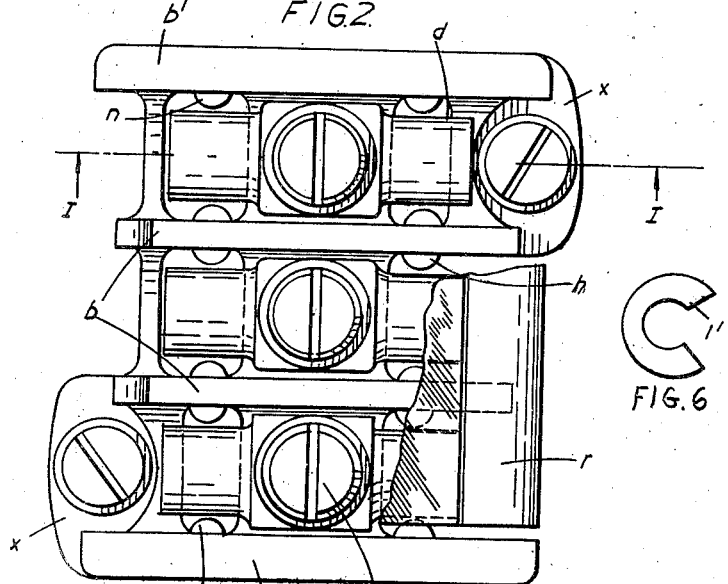
Inventors:
Walter E. Hill, Thomas O. G. Wintle & Richard
By W. Morgan
Smith, Michael and Gardiner,
Attorneys.

July 16, 1946.    W. E. HILL ET AL    2,403,979
COUPLING FOR ELECTRICAL WIRING SYSTEMS
Filed June 13, 1944    2 Sheets-Sheet 2
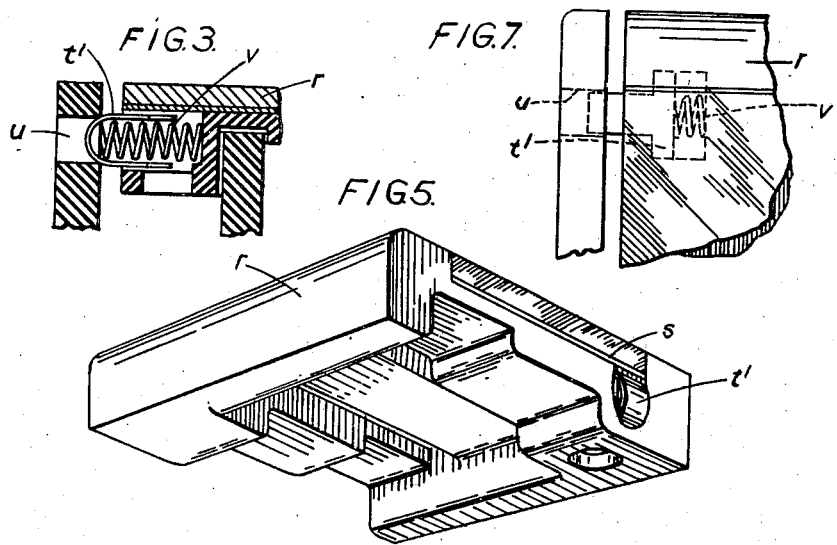
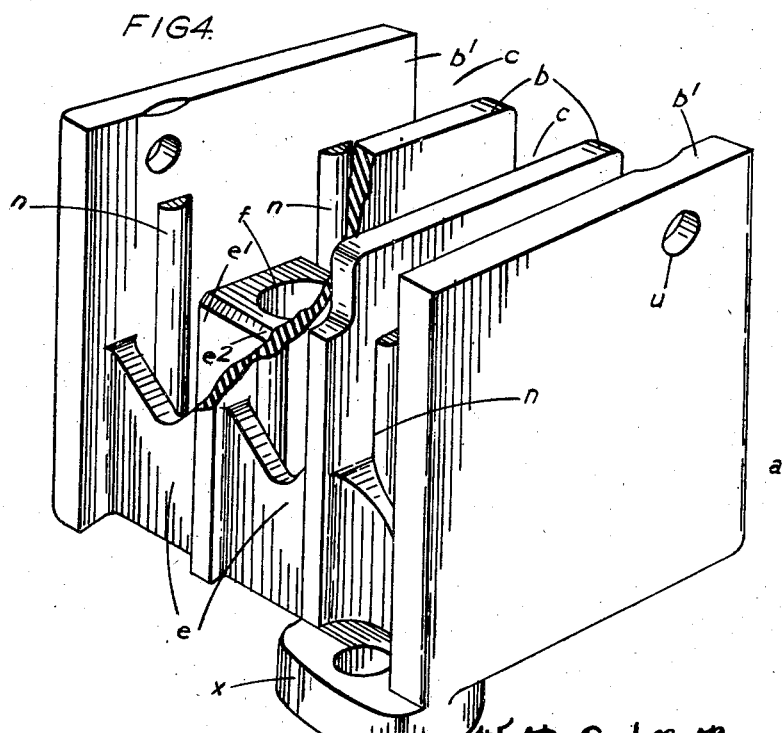

Patented July 16, 1946

2,403,979

UNITED STATES PATENT OFFICE 2,403,979

COUPLING FOR ELECTRICAL WIRING SYSTEMS

Walter E. Hill, Streetly, and Thomas D. G. Wintle, and Richard W. Morgan, Walsall, England, assignors to J. A. Crabtree & Co. Ltd., Walsall, England, a company of Great Britain Application June 13, 1944, Serial No. 540,058
In Great Britain September 17, 1943

10 Claims. (Cl. 173—328)

This invention relates to improvements in and connected with couplings for electrical wiring systems, and is particularly concerned with the socket construction and mounting of couplings for use in the wiring of aircraft in which a large number of connections are required to be made at junction boxes, distribution boards, and other points situated between a generator and various electrically controlled accessories.

The object of the invention is to provide an improved construction of socket and mounting of relatively small weight adapted for facilitating the detachment and withdrawal of a socket from its mounting, while possessing advantageous electrical properties and moisture proof characteristics.

According to the invention, the socket comprises clamp members adapted to be positively locked in embracing engagement with a plug by a screw and associated with a spring adapted for releasably maintaining the clamping engagement in the event of inadvertent loosening of the screw which engages with a threaded part of the base on which the socket is mounted. The spring, preferably a helical compression spring, may be disposed around the screw, being operative between a washer thereon and the lower clamp member of the socket. When the screw is disengaged from the threaded part, such as a tapped insert in the base, the washer seats on an annular shoulder constituted by the thread of the screw portion. The washer thus retains the spring and the socket clamps on the screw, the arrangement thereby enabling such parts to be removed from, or mounted in, the base, as a unit.

The back of a recess in the base for receiving the insert and the spring is preferably closed so that access of moisture to the parts is prevented, while deep spaces are formed in the base for affording barriers which act not only for directing water or moisture from the coupling, but also serve to provide extended creepage paths. In addition, such spaces serve for reducing the weight of the construction.

A cover may be provided for the coupling when it is not mounted in an enclosing box, this cover being produced from a moulding and having a spring catch device co-operating with the upstanding side walls of the base for permitting ready withdrawal and mounting. The cover is also arranged to be disposed within the contour of the base so that the space occupied by the coupling, when viewed in plan, is not extended beyond the base.

In order to enable the invention to be readily understood, reference will now be made to the accompanying drawings illustrating, by way of example, one construction for carrying the invention into effect, in which drawings:

Figure 1 is a central vertical section with parts in elevation, the section being on the line I—I of Figure 2.

Figure 2 is a plan of Figure 1, a portion of the cover being removed.

Figure 3 is a section on an enlarged scale taken on the line III—III of Figure 1.

Figure 4 is a perspective view, with parts broken away, of the moulded block or base for mounting the socket clamps.

Figure 5 is a perspective view of the cover.

Figure 6 is a plan of a retaining washer.

Figure 7 is a plan on an enlarged scale, illustrating the releasable catch for the cover.

Referring to the drawings, base $a$ made from a moulding of insulating material, comprises a number of vertical partitions, $b$, $b'$, forming therebetween separated compartments $c$ for socket clamps $d$ of a construction to be hereinafter more fully described. Transverse side walls $e$ in the lower part of each compartment, have disposed centrally between them cubical shaped blocks $e^1$ each having a recess $f$ in which there is secured during the moulding operation a tapped metal insert $g$, the upper end $g^1$ of which affords an internal annular shoulder within the recess. Each compartment is adapted to receive a superposed pair of sockets, as shown, or one only of such sockets. Each socket comprises a pair of similar clamps secured by a screw $i$ having a thread $i^1$ at its lower end for engagement with the tapped insert $g$. A short length above the thread of the screw $i$ is of reduced diameter to provide a groove $l$ for receiving a washer $l^1$. A short helical compression spring $k$ disposed around the screw $i$ is operative compressively between the washer $l^1$ and the lower clamp of the socket. According to the example shown in Figure 6, the self retaining washer $l^1$ is of C-shape in plan, and is contracted around the reduced stem of the screw, while being capable of movement along the groove $l$. The arrangement enables a socket or superposed sockets to be removed together with a screw, spring and washer, as a unit. When mounted in position, the washer seats on the upper end of insert $g$, and the spring $k$ acts compressively between the washer and the lower member of the clamp thus pressing the clamps upwardly against the head $l^2$ of the screw, so that resilient pressure is maintained on a plug $m$ even if the screw be inadvertently loosened, The insert $g$ is of extended length so that the screw has adequate engagement therewith. Thus there is no necessity for rolling over the end of the screw for preventing escape of a thin nut as illustrated, for example, in U. S. Patent No. 2,360,304 of October 10, 1944 aforesaid, and the screw may be made of non-corrodible non-ferrous metal. The arrangement also limits the compression of the spring so that its convolutions are prevented from becoming solid, and any tendency of the spring to be deflected from its longitudinal axis is eliminated. The removal or replacement of a socket, screw, washer and spring as a unit, can be performed without removing the base, it being understood that the spring $k$ is retained in position between the socket clamp and the washer $l^1$ which is maintained in position on the screw by virtue of its engagement in the groove $g^1$. Instead of forming a groove along the length of the screw, the threaded portion $i^1$ could be of enlarged diameter with respect to the diameter of the shank of the screw to constitute an annular shoulder or abutment for the washer $l^1$. The arrangement also enables a single socket clamp to be removed as a unit and replaced, if necessary, by a double tier unit composed of superposed socket clamps as shown in the accompanying drawings.

The sockets are supported midway of their lengths by the seating of a lower clamp on the upper end of a cubical block $e^1$. This end is disposed at a higher level than the upper edge of the walls $e$, while the vertical partitions $b$, $b^1$ are spaced from the sockets. As a result, the latter are supported only on the periphery of the mouth of the recess, the area of contact being restricted by bevelling the walls of the mouth at $e^2$, as shown in Figure 1. Consequently, a long creepage path is provided between sockets in adjacent compartments with the result that the electrical characteristics of the device are of a high degree of efficiency. In order to avoid contact of the ends of the socket with the partitions due to lateral pull on the cables, parallel ribs $n$ are formed on each face of each of said partitions. Thus in the event of such a pull on the cable, the socket abuts against a rib $n$ with the result that the contact with the insulating wall is displaced a substantial distance inwardly from the vertical edge of a partition and a creepage path of considerable length is still maintained. The spaces $c$ between the cubical parts $e$ and the lateral walls $l$ likewise contribute to the advantageous electrical characteristics, while the arrangement serves for deflecting moisture away from the sockets and prevents its collection in the vicinity of the latter. Lateral feet $x$ are provided for the attachment of the block to a panel or wall without the employment of an intermediate sub-base. By extending these feet in the direction of the cable the overall length of the block is enabled to be of minimum dimensions.

The socket may be provided with a cover $r$ made from a moulding of insulating material, this cover being of shallow rectangular construction adapted, when viewed in plan, to be contained within the contour of the base. Its upper surface is recessed for the reception of an identification plate $s$ secured in position by a screw $t$, and at diametrically opposite corners, is provided with spring catches $t^1$ for releasable engagement with openings or recesses $u$ in the outer partitions $b^1$ of the base. Each catch may be of U-shape, its inner free ends having lateral extensions $t^1$ engageable behind shoulders of the cover for trapping it in position. The catch $t^1$ is forced outwardly by a helical compression spring $v$ disposed between its side limbs so that its rounded portion is projected beyond the side walls of the cover for engagement in an opening $u$.

We claim:

1. A socket for an electric coupling comprising an insulating block, a clamp member supported in said block and adapted to be positively locked in embracing engagement with a plug inserted therein, a locking screw extending through said member, said screw having a head for engaging one side of said clamp member and having an abutment adjacent its opposite end positioned in spaced relation from the other side of said clamp, a tapped nut in the block for receiving said locking screw, and a spring around said screw and operative compressively between a clamp member and the abutment on the screw for maintaining resilient pressure of a clamp member on an inserted plug in the event of inadvertent loosening of the screw.

2. A socket for an electric coupling comprising an insulating block, socket members mounted on said block, a screw having a threaded end engageable with the block and a plain portion extending through said members and terminating in a head for positively locking the clamps in engagement with a plug, a helical spring encircling the screw, and a washer around a reduced portion of the screw between its threaded and plain portions, said washer being adapted to seat on an annular shoulder constituted by the thread of the screw when the parts are removed as a unit from the block.

3. A socket for an electric coupling, comprising an insulating block recessed for the reception of a pair of socket clamps and adapted for positive locking engagement with a plug, a screw extending freely through said members and having a short threaded end portion engageable in a tapped insert in a thimble shaped part of the block below the recess for maintaining said locking engagement, a washer loose on a reduced part of the screw and adapted to be retained thereon by seating against the annular shoulder afforded by the threaded part, and a helical spring operative compressively between said washer and clamp members for maintaining resilient pressure of the latter on the plug in the event of inadvertent loosening of the screw.

4. A socket for an electric coupling in which clamps, adapted to be locked in embracing engagement with a plug by a screw, are associated with a spring for releasably maintaining the clamping engagement in the event of inadvertent loosening of the screw, comprising a mounting block having deep recesses forming compartments separated by vertical partitions, and a socket of lesser maximum width than the width of a compartment mounted in each compartment and supported midway of its length therein so that the ends of said sockets are free from contact with the adjacent partitions defining the compartments, thereby providing a creepage path of extended length between the sockets in adjacent compartments.

5. A socket for an electric coupling in which clamps adapted to be locked in embracing engagement with a plug by a screw, are associated with a spring for releasably maintaining the clamping engagement in the event of inadvertent loosening of the screw, comprising a mounting block of insulating material having deep recesses forming compartments separated by vertical partitions the bottom of each recess being raised at a portion midway of its length for supporting a socket so that its ends are free from contact with the block, the partitions being formed with vertical ribs for engagement with the sides of the socket at a point disposed inwardly from their ends in the event of their turning about the point of support.

6. A socket for an electric coupling in which clamps adapted to be locked in embracing engagement with a plug by a screw are associated with a spring for releasably maintaining the clamping engagement in the event of inadvertent loosening of the screw, comprising a mounting block of insulating material having deep recesses forming compartments separated by vertical partitions, a socket being supported midway of its length on a raised portion of the base of each compartment, said raised portion being constituted by the upper bevelled edge of a thimble-shaped portion into which extends a screw the tapped portion of which enters a threaded insert nut, the spring encircling a plain portion of the screw and being operative compressively between a clamp member and a washer around a reduced portion of the screw and seating on the upper end of the nut.

7. In a socket for an electric coupling in accordance with claim 5, the provision at opposite corners of the block of securing feet each of which is disposed in line with the axis of a clamp.

8. A socket for an electric coupling in which clamps adapted to be locked in embracing engagement with a plug by a screw are associated with a spring for releasably maintaining the clamping engagement in the event of inadvertent loosening of the screw, comprising a mounting block of insulating material having deep recesses forming compartments separated by vertical partitions, transverse side walls in the lower part of each compartment and cubical shaped portions disposed centrally between said side walls and each formed with a recess for receiving a tapped metal insert, the mouth of a recess being bevelled and disposed at a higher level than the side walls for supporting a socket in a compartment.

9. A socket for an electric coupling comprising a clamp member adapted to be positively locked in an embracing engagement with a plug inserted therein; a locking screw extending through said member, said screw having a head for engaging one side of said clamp member and having an abutment adjacent its opposite end positioned in spaced relation from the other side of said clamp; and a spring around said screw and operative compressively between said clamp member and the abutment on the screw for maintaining resilient pressure of the clamp on an inverted plug in the event of inadvertent loosening of the screw.

10. A socket for an electric coupling comprising socket members, a screw having a threaded end and a plain portion extending through said members and terminating in a head for positively locking said members in engagement with a plug, a helical spring encircling said screw, and a washer around a reduced portion of the screw between its threaded and plain portions, said washer seating on an annular shoulder constituted by the thread of the screw.

W. E. HILL.
THOS. D. G. WINTLE.
R. W. MORGAN.